(12) United States Patent
Sonnerer et al.

(10) Patent No.: US 8,849,482 B2
(45) Date of Patent: Sep. 30, 2014

(54) PASSENGER TRANSPORTATION SYSTEM AND RELATIVE CONTROL METHOD

(75) Inventors: Walter Sonnerer, Bolzano (IT); Giuseppe Conte, Bolzano (IT)

(73) Assignee: Rolic International S.AR.L., Luxembourg (LU)

( * ) Notice: Subject to any disclaimer, the term of this patent is extended or adjusted under 35 U.S.C. 154(b) by 155 days.

(21) Appl. No.: 13/518,279

(22) PCT Filed: Dec. 22, 2010

(86) PCT No.: PCT/IB2010/003328
§ 371 (c)(1),
(2), (4) Date: Oct. 12, 2012

(87) PCT Pub. No.: WO2011/077233
PCT Pub. Date: Jun. 30, 2011

(65) Prior Publication Data
US 2013/0054057 A1 Feb. 28, 2013

(30) Foreign Application Priority Data

Dec. 23, 2009 (IT) .............................. MI2009A2273

(51) Int. Cl.
*B61B 11/00* (2006.01)
*B61B 7/02* (2006.01)
*B61B 13/12* (2006.01)
*B61B 12/10* (2006.01)

(52) U.S. Cl.
CPC ...................................... *B61B 7/02* (2013.01); *B61B 12/105* (2013.01)
USPC ........... 701/19; 310/12.22; 318/135; 104/292

(58) Field of Classification Search
CPC ....... B60L 5/005; B60L 11/182; B60L 13/00; B61B 13/12; B61C 13/04
USPC ............................. 701/19; 104/292; 318/135; 310/12.01–12.22
See application file for complete search history.

(56) References Cited

U.S. PATENT DOCUMENTS 3,757,112 A * 9/1973 Lehmann .................. 246/122 R
3,834,316 A * 9/1974 Hennings ...................... 104/291
(Continued)

FOREIGN PATENT DOCUMENTS

| DE | 2328366 | 12/1974 |
|---|---|---|
| EP | 0626299 | 11/1994 |
| WO | 2009019259 | 2/2009 |

OTHER PUBLICATIONS

PCT Request (Form PCT/RO/101) for International Application No. PCT/IB2010/003328 dated Dec. 22, 2010.

(Continued)

*Primary Examiner* — Fadey Jabr
*Assistant Examiner* — Courtney Heinle
(74) *Attorney, Agent, or Firm* — Neal, Gerber & Eisenberg LLP

(57) ABSTRACT

A passenger transportation system having at least one rail extending along a path; at least one trolley movable along the rail; an actuating device having a linear electric motor, in turn having at least one slide fitted to the trolley, and a linear stator extending at least partly along the path, and having an elongated body, and a quantity of power windings embedded in the elongated body; and a quantity of sensors configured to control the position of the trolley, the sensors being fitted to the elongated body and so positioned as to minimize noise generated by the power windings on the sensors.

47 Claims, 6 Drawing Sheets

(56) References Cited

U.S. PATENT DOCUMENTS

| | | | | |
|---|---|---|---|---|
| 3,834,318 | A | * | 9/1974 | Fellows et al. ............... 104/284 |
| 3,974,778 | A | * | 8/1976 | Black et al. .................. 104/292 |
| 4,061,089 | A | * | 12/1977 | Sawyer ....................... 104/23.2 |
| 4,836,344 | A | * | 6/1989 | Bolger ......................... 191/10 |
| 4,862,809 | A | * | 9/1989 | Guadagno ..................... 104/292 |
| 5,158,021 | A | * | 10/1992 | Matsui et al. ................. 104/292 |
| 5,492,066 | A | * | 2/1996 | Nozaki et al. .................. 104/93 |
| 5,582,107 | A | * | 12/1996 | Nozaki ......................... 104/89 |
| 5,626,082 | A | * | 5/1997 | Nozaki ......................... 104/252 |
| 6,499,701 | B1 | * | 12/2002 | Thornton et al. ............. 246/194 |
| 6,578,495 | B1 | * | 6/2003 | Yitts et al. ................... 104/292 |
| 2007/0069666 | A1 | * | 3/2007 | Van Eijk et al. ............. 318/135 |

OTHER PUBLICATIONS

Notification Concerning Submission, Obtention or Transmittal of Priority Document (Form PCT/IB/304) for International Application No. PCT/IB2010/003328 dated Apr. 8, 2011.

International Search Report and Written Opinion for International Application No. PCT/IB2010/003328 dated Mar. 28, 2011.

First Notice Informing the Applicant of the Communication of the International Application (Form PCT/IB/308) for International Application No. PCT/IB2010/003328 dated Jul. 28, 2011.

Second and Supplementary Notice Informing the Applicant of the Communication of the International Application (Form PCT/IB/308) for International Application No. PCT/IB2010/003328 dated Apr. 26, 2012.

* cited by examiner

PASSENGER TRANSPORTATION SYSTEM AND RELATIVE CONTROL METHOD

PRIORITY CLAIM

This application is a national stage application of PCT/IB2010/003328, filed on Dec. 22, 2010, which claims the benefit of and priority to Italian Patent Application No. MI2009A 002273, filed on Dec. 23, 2009, the entire contents of which are each incorporated by reference herein.

BACKGROUND

In certain transportation systems comprising a linear electric motor, the position of the slide is normally determined by proximity sensors, such as described in PCT Patent Application WO 2009/019259.

Correct operation of the transportation system therefore depends directly on the sensors, and in particular the location of the sensors.

Known transportation systems are normally installed by first installing the structural components, and then the control components.

If the sensors are located wrongly during installation of the system (e.g., in the wrong position, such as too close, or too far away) with respect to the rail, and therefore with respect to the slide transit area, this could result in malfunctioning of the system, with all the assembly or repair cost and time this entails.

SUMMARY

In various embodiments, the present disclosure relates to a passenger transportation system and relative control method.

More specifically, one embodiment of the present disclosure relates to a transportation system comprising:
at least one rail extending along a path;
at least one trolley movable along the rail; and
an actuating device comprising a linear electric motor, in turn comprising at least one slide fitted to the trolley, and a linear stator extending at least partly along the path, and comprising an elongated body, and a quantity of power windings embedded in the elongated body.

The slide is moved by a magnetic field generated by the linear stator, and is controlled by the magnetic field as a function of the position or speed of the slide.

It is an advantage of the present disclosure to provide a transportation system configured to eliminate certain of the drawbacks of known transportation systems, and in particular to provide a transportation system which can be installed cheaply and easily.

Another advantage of the present disclosure is to provide a transportation system that is less susceptible to installation defects.

According to one embodiment of the present disclosure, there is provided a passenger transportation system comprising:
at least one rail extending along a path;
at least one trolley movable along the rail;
an actuating device comprising a linear electric motor, in turn comprising at least one slide fitted to the trolley, and a linear stator extending at least partly along the path, and comprising an elongated body, and a quantity or number of power windings embedded in the elongated body; and a quantity or number of sensors configured to control the position of the trolley; the sensors being fitted to the elongated body and so positioned as to minimize noise generated by the power windings on the sensors.

In one embodiment of the present disclosure, the sensors can be fitted accurately to the elongated body at the production plant, before installing the system, thus avoiding any problems posed by improper assembly of the sensors at the installation stage.

In one embodiment, the sensors are embedded in the elongated body.

In one embodiment of the present disclosure, the sensors are removably installed in a designated position to ensure correct operation of the transportation system.

In another embodiment, the power winding generates a first magnetic field by passage of current in the power winding; the slide includes a second magnetic field generator which generates a second magnetic field which interacts with the first magnetic field and moves the slide along the path; the sensor comprising a control winding; and the second magnetic field travels through the control winding when the slide travels close to the control winding; the control winding generating current by interaction with the second magnetic field.

In one embodiment of the present disclosure, the control winding effectively determines passage of the slide in a relatively simple, functional, low-cost manner, and needs no power, by virtue of passage of the slide being determined by interaction of the second magnetic field on the control winding; which interaction generates a detection signal on the control winding—in the example shown, in the form of a voltage or electric current generated by linkage of the second magnetic field with the control winding.

Another advantage of the present disclosure is to provide a method of controlling a transportation system configured to eliminate certain of the drawbacks of known transportation systems.

Another advantage of the present disclosure is to provide a relatively simple, effective method of controlling a transportation system.

According to one embodiment of the present disclosure, there is provided a transportation system control method; the transportation system comprising an actuating device in turn comprising a linear electric motor, which comprises at least one slide and a linear stator extending at least partly along a path and in turn comprising at least one power winding; and at least one control winding; the slide and the linear stator being magnetically connectable to induce movement of the slide along the path; and the method comprising the steps of the control windings detecting a transit signal, and determining a position or speed of the slide as a function of the transit signal.

Additional features and advantages are described in, and will be apparent from the following Detailed Description and the figures.

BRIEF DESCRIPTION OF THE DRAWINGS

A non-limiting embodiment of the present disclosure will be described by way of example with reference to the accompanying drawings, in which.

DETAILED DESCRIPTION

Figure 1:
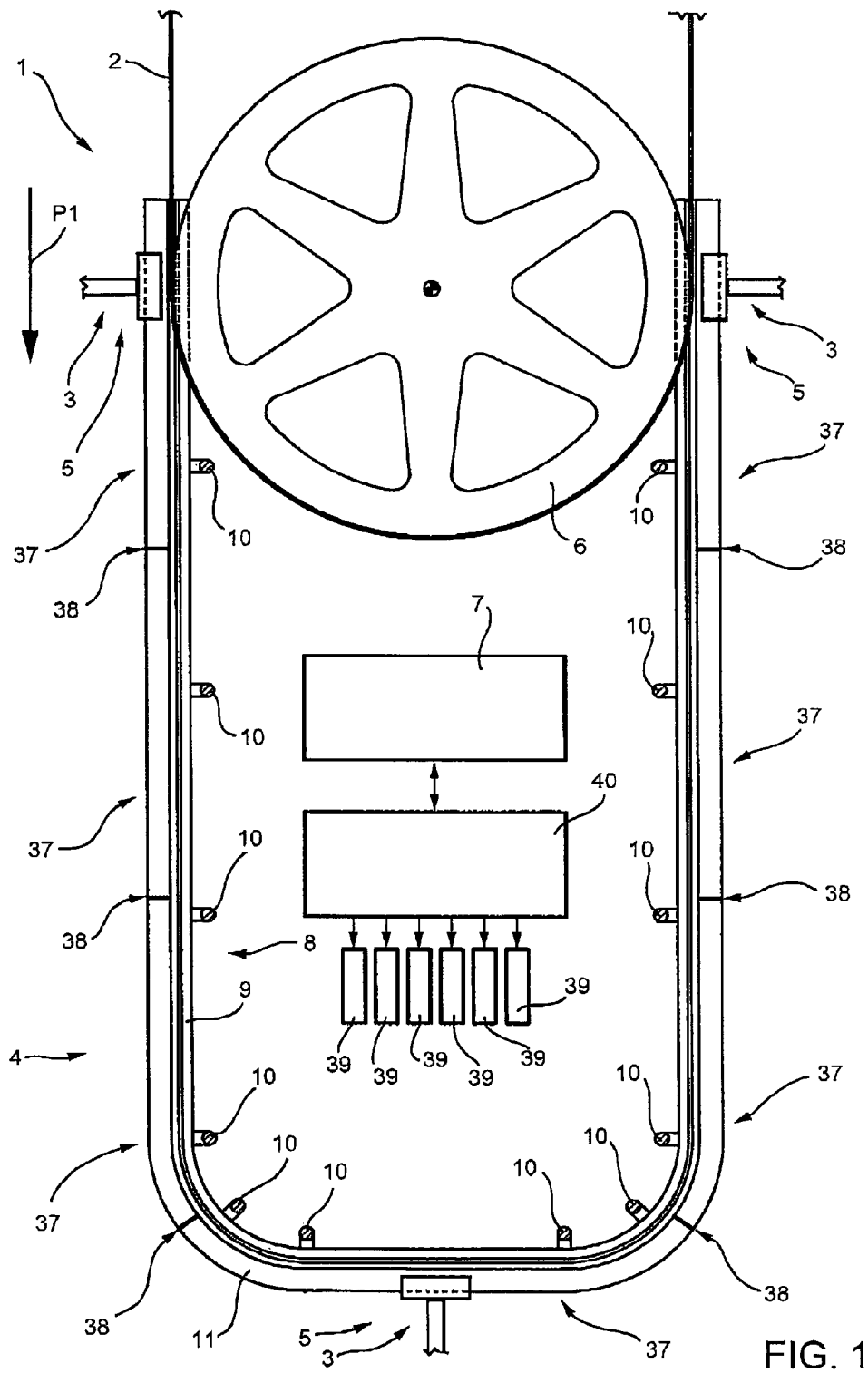
FIG. 1 shows a partly sectioned plan view, with parts removed for clarity, of a cable transportation system equipped with a linear electric motor.

Referring now to the example embodiments of the present disclosure illustrated in FIGS. 1 to 7, number 1 in FIG. 1 indicates a passenger transportation system. In the FIG. 1 example, transportation system 1 is a cable transportation system, and comprises a looped draw cable 2; and a quantity or number of transportation units 3 of the type suspendable from draw cable 2—such chairs of a chairlift or cars of a cable-car system—and movable along a given or designated path P1.

Transportation system 1 comprises a passenger station 4; and an actuating device in turn comprising a linear electric motor 5 configured to drive transportation units 3 into passenger station 4.

Linear electric motor 5 is located partly in transportation units 3 and partly in passenger station 4.

Passenger station 4, which in the example shown is a turn-around station, comprises a pulley 6, about which draw cable 2 is looped; a control unit 7; and a frame 8 supporting transportation units 3 in passenger station 4.

Frame 8 extends along a portion of path P1, and comprises a beam 9 which, viewed from above, is U-shaped, and supports a quantity or number of supporting structures 10.

Linear electric motor 5 comprises a linear stator 11, which extends along path P1, is supported by beam 9, and, viewed from above, is U-shaped.

Figure 2:
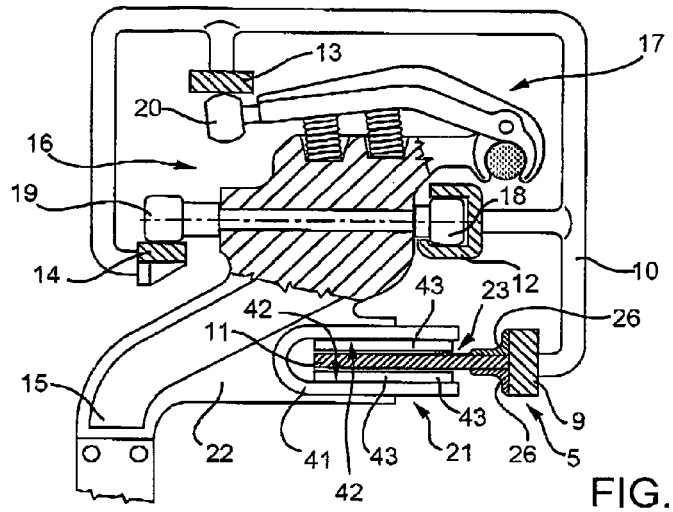
FIG. 2 shows a larger-scale, partly sectioned front view, with parts removed for clarity, of a detail of the FIG. 1 cable transportation system.

With reference to FIG. 2, each supporting structure 10 supports three rails 12, 13, 14; and each transportation unit 3 comprises a suspension arm 15, and a trolley 16 which engages rails 12, 13, 14 at station 4.

Trolley 16 comprises a coupling device 17 configured to selectively connect trolley 16 and transportation unit 3 to draw cable 2, and which, in FIG. 2, is shown releasing draw cable 2.

Trolley 16 has three rollers 18, 19, 20, which engage respective rails 12, 14, 13 to define a given or designated position of trolley 16. Accordingly, rail 12 has a C-shaped cross section, and respective roller 18 engages the C-section rail 12.

For each transportation unit 3, linear electric motor 5 comprises a slide 21 integral with trolley 16, and which cooperates with linear stator 11 to move respective transportation unit 3 inside passenger station 4. In the example shown, slide 21 is connected to trolley 16 and suspension arm 15 by a bracket 22.

Each transportation unit 3 travelling through passenger station 4 is moved by respective slide 21, which couples with linear stator 11 of linear electric motor 5, which, together with rails 12, 13, 14, defines an auxiliary actuating device of transportation system 1.

Figure 5:
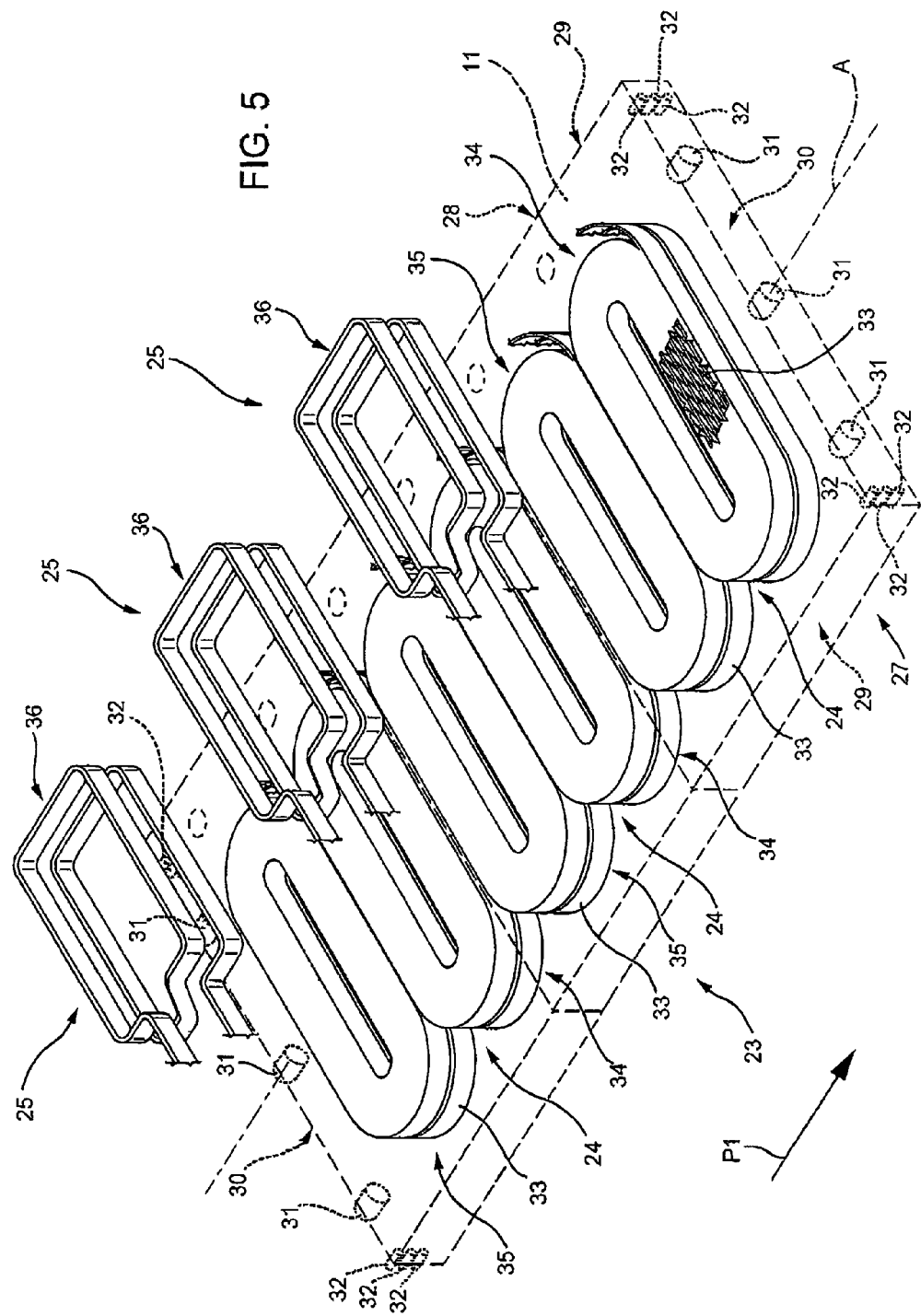
FIG. 5 shows a larger-scale, partly sectioned plan view, with parts removed for clarity, of the detail of the linear electric motor in FIG. 1.

With reference to FIG. 5, linear stator 11 comprises an elongated body 23 (FIG. 3) of nonferrous material—in the example shown, glass-fibre-reinforced epoxy resin; a quantity or number of power windings 24 embedded in elongated body 23, and which generate a first magnetic field by passage of electric current in power windings 24; and a quantity of sensors 25 fitted to elongated body 23, and configured to control the position of trolley 16.

Figure 3:
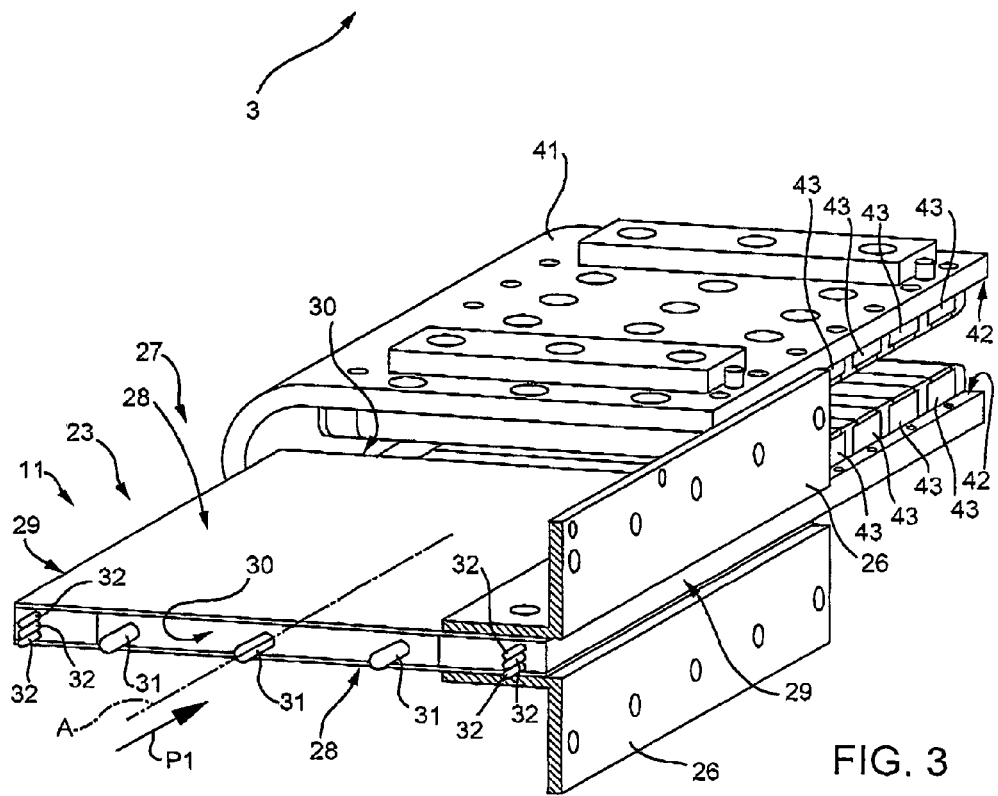
FIG. 3 shows a partly sectioned view in perspective, with parts removed for clarity, of a detail of the linear electric motor of the FIG. 1 cable transportation system.

In the FIG. 3 example, linear stator 11 comprises brackets 26 configured to fix elongated body 23 to beam 9 (FIG. 1).

Sensors 25 are arranged with respect to power windings 24 to minimize the noise generated by power windings 24 on sensors 25, and, in particular, are embedded in elongated body 23.

Slide 21 comprises a second magnetic field generator which generates a second magnetic field, which interacts with the first magnetic field and moves slide 21 along path P1.

Figure 7:
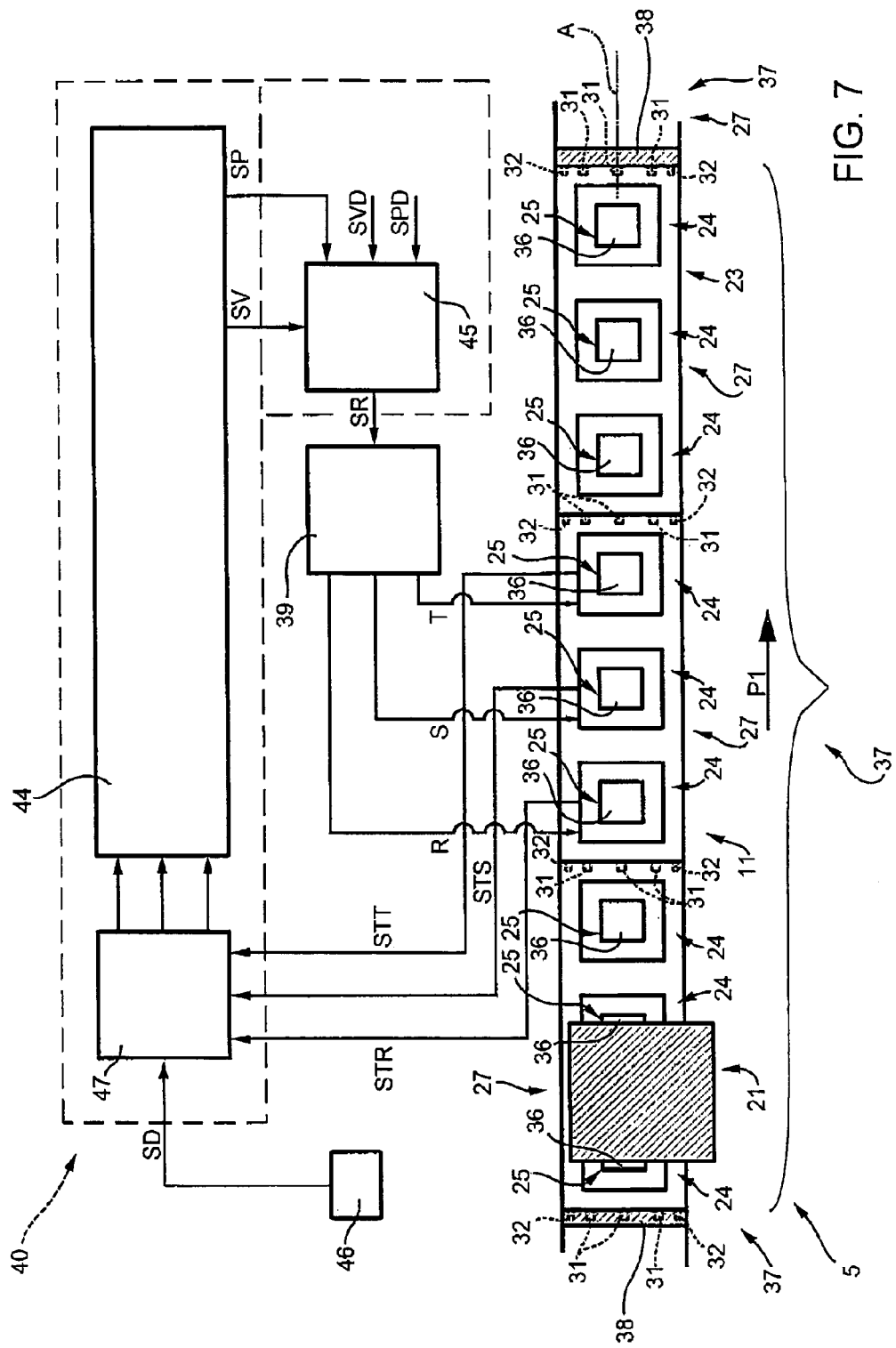
FIG. 7 shows a schematic of a detail of the linear electric motor in FIG. 1, and a relative control unit.

With reference to FIG. 7, elongated body 23 comprises a quantity or number of modular units 27 aligned along path P1.

With reference to FIG. 3, each modular unit 27 extends along an axis of symmetry A, and is in the form of a flat plate to define a straight portion of path P1. In another embodiment (not shown in the drawings), each modular unit is in the form of a curved plate to define a curved portion of path P1.

Each modular unit 27 has a rectangular cross section; two opposite, parallel main faces 28 positioned substantially horizontally; two lateral faces 29; and two end faces 30.

With reference to FIG. 7, each modular unit 27 comprises a given or designated quantity of said quantity of power windings 24. More specifically, each modular unit 27 comprises three power windings 24 arranged in succession and associated with respective phases R, S and T.

With reference to FIG. 5, each modular unit 27 comprises a quantity or number of power connection elements 31 configured to connect the designated quantity of power windings 24 to the designated quantity of power windings 24 of an adjacent modular unit 27, and each of which is parallel to axis of symmetry A. More specifically, each modular unit 27 comprises six power connection elements 31 located along end faces 30, and which, in the example shown, comprise three male connection elements and three female connection elements, are divided between the two end faces 30, and are symmetric with respect to axis of symmetry A.

Each modular unit 27 comprises a designated quantity of sensors 25; and a quantity of control connection elements 32 configured to control sensors 25 and connecting the given or designated quantity of sensors 25 of modular unit 27 to the given or designated quantity of sensors 25 of an adjacent modular unit 27. More specifically, each modular unit 27 comprises three sensors 25; and, in one embodiment, control connection elements 32 are located along end faces 30 and divided equally between male control connection elements and female control connection elements.

In one embodiment, each modular unit 27 comprises twelve control connection elements 32, so they can be arranged symmetrically with respect to axis of symmetry A along each end face 30. Though six control connection elements 32 would be enough to connect sensors 25 of modular units 27, the control connection elements 32 along each end face 30 are, in at least one embodiment, doubled so they can be arranged symmetrically along end faces 30.

Figure 6:
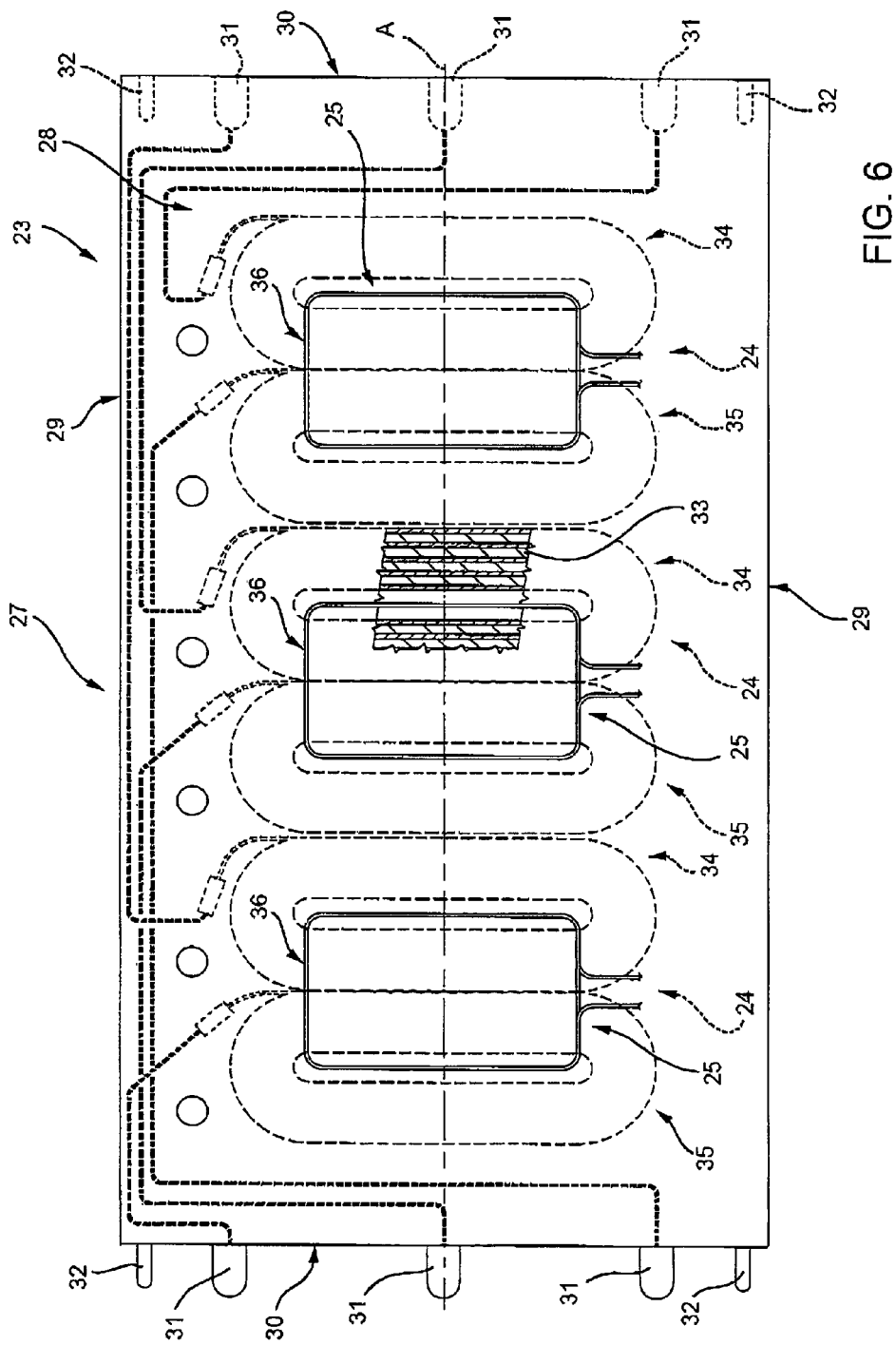
FIG. 6 shows a partly exploded, partly sectioned view in perspective, with parts removed for clarity, of a detail of the linear electric motor in FIG. 1.

With reference to FIG. 6, power winding 24 comprises a conductor 33, such as a flat conductor perpendicular to main faces 28.

Figure 4:
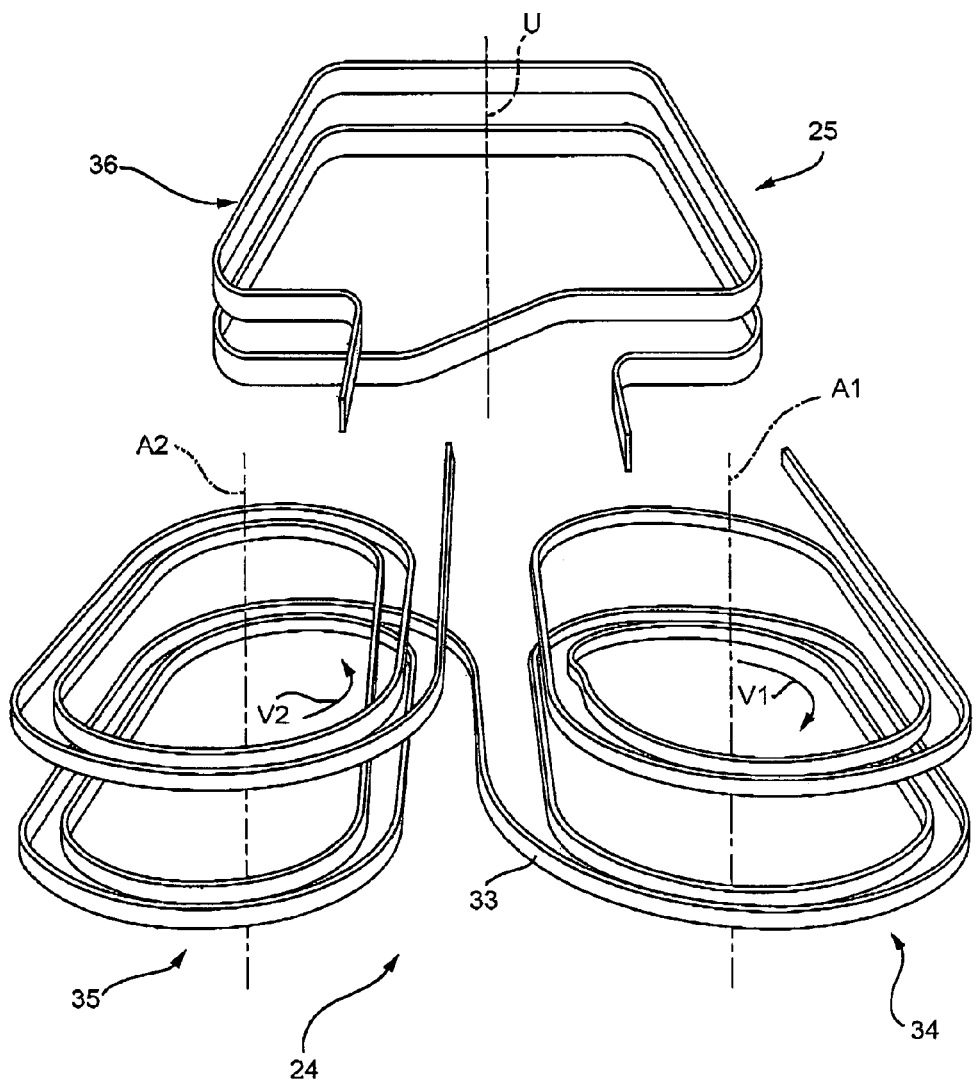
FIG. 4 shows a schematic exploded view in perspective, with parts removed for clarity, of a detail of the linear electric motor in FIG. 3.

With reference to FIG. 4, power winding 24 is wound in a direction V1 about an axis A1 to form a coil 34 comprising a quantity or number of turns, and in a direction V2, opposite V1, about an axis A2 to form a coil 35 comprising a quantity or number of turns. For the sake of simplicity, only a few of the turns of power winding 24 are shown. Each coil 34, 35 comprises two groups of turns wound in the same direction; and the two groups lie in separate planes, are parallel to each other and to main faces 28 (FIG. 3), and form a gap between the two planes.

In an alternative embodiment (not shown in the drawings), power winding 24 comprises a one-turn coil 34, and a one-turn coil 35.

In one embodiment of the present disclosure, coils 34 and 35 of power winding 24 each have twenty-four or forty-eight turns and are connected to each other.

With reference to FIG. 6, each sensor 25 comprises a control winding 36 embedded in the non-ferrous material of elongated body 23, and configured to detect passage of slide 21 (as seen in FIG. 3). In other words, each sensor 25 is substantially defined by control winding 36 itself. When slide 21 passes close to control winding 36, the second magnetic field generated by slide 21 (as seen in FIG. 7) links with control winding 36, which is configured to generate electric current from the interaction with the second magnetic field.

With reference to FIG. 4, control winding 36 has a plane of symmetry U equidistant from axis A1 and axis A2.

With reference to FIG. 7, each modular unit 27 comprises three control windings 36, which are associated with the three power windings 24 of the same modular unit 27, are arranged in succession, and are therefore associated with respective phases R', S', T' coupled with respective phases R, S, T.

In one embodiment, linear stator 11 is divided into modular sections 37, each comprising a quantity of modular units 27. The power windings 24 of the same modular section 37 and associated with the same phase R, S, T are connected in series with one another by power connection elements 31, and define respective groups of power windings 24. Similarly, the control windings 36 of the same modular section 37 and associated with the same phase R', S', T' are connected in series with one another by control connection elements 32, and define respective groups of control windings 36. Both power- and control-wise, each modular section 37 is isolated electrically from the other modular sections 37 by isolating elements 38, and has connectors (not shown) configured to connect power windings 24 and sensors 25 to a power assembly 39 configured to power power windings 24, and which is adjustable in voltage, current, frequency, and phase, and, in the example shown, comprises an inverter.

Sensors 25 of each section are connected to a control unit 40, which controls power assembly 39.

Power connection elements 31 and control connection elements 32 are symmetrical with respect to axis of symmetry A, so two modular units 27 can be connected to form a succession of power phases R, S, T, R, S, T and a succession of control phases R', S', T', R', S', T', or a succession of power phases R, S, T, T, S, R and a succession of control phases R', S', T', T', S', R', by simply turning one of the two modular units 27 over about axis of symmetry A.

With reference to FIG. 1, in addition to linear electric motor 5, the actuating device comprises control unit 40, which is connected to control unit 7 of transportation system 1; and a quantity of power assemblies 39 equal to the quantity of modular sections 37 of linear stator 11. An alternative embodiment (not shown in the drawings), includes one power assembly for all the sections, and comprises a quantity of independently adjustable three-phase outputs, equal to the quantity of modular sections.

With reference to FIG. 1, each power assembly 39 is connected to respective power windings 24 and to control unit 40, and comprises three output terminals, each associated with one of phases R, S, T, so each group of power windings 24 is powered with the same frequency F, the same current intensity I, and one of phases R, S, T.

With reference to FIG. 3, each slide 21 comprises a U-shaped plate 41 with two opposite parallel faces 42, along which are fitted two sets of permanent magnets 43.

The two sets of permanent magnets 43 are arranged opposite each other and far enough apart to fit slide 21 about linear stator 11. That is, each set of permanent magnets 43 is substantially parallel to and faces a main face 28 of elongated body 23, so as to form a gap between permanent magnets 43 and respective main face 28.

With reference to FIG. 5, control windings 36 are equally spaced along path P1, and detect passage of transportation units 3 (as seen in FIG. 1) along path P1.

With reference to FIG. 7, control unit 40 acquires transit signals STR, STS, STT; calculates speed signals SV related to speeds V, and position signals SP related to positions P of slide 21; and compares speed signals SV with a target speed signal SVD related to a target speed VD.

With reference to FIG. 4, control winding 36 is positioned so that the magnetic flux from power winding 24 linked to it is substantially nil. In other words, control winding 36 is so located inside linear stator 11 that, when power winding 24 is powered, the positive magnetic flux generated by coil 34 or 35 through the inner surface defined by control winding 36 substantially equals the negative magnetic flux generated by coil 35 or 34 through the inner surface defined by control winding 36. The total flux through the inner surface defined by control winding 36 is thus substantially zero, and so induces no voltage at the terminals of control winding 36.

Each control winding 36 is configured to detect passage of slide 21. That is, the variation in magnetic flux produced by passage of slide 21 induces, at the terminals of control winding 36, a voltage which produces transit signal STR, STS or STT.

The control windings 36 associated with the same phase R', S', T' and the same modular section 37 of linear stator 11 are connected in series, and define respective (i.e., three), groups of control windings 36: one associated with phase R', one with phase S', and one with phase T'.

Three transit signals STR, STS, STT, emitted by respective groups of control winding 36 and connected to control unit 40, are therefore defined for each modular section 37.

With reference to FIG. 7, control unit 40 comprises a processing block 44 configured to process transit signals STR, STS and STT, and calculate speed signal SV and position signal SP.

Processing block 44 is also configured to condition transit signals STR, STS, STT according to the speed signals SV of slide 21 calculated the instant before.

To calculate speed signal SV, processing block 44 processes the transit signals STR, STS, STT from respective phases R', S', T' to change from stationary coordinates to two movable coordinates: a direct coordinate, and a quadrature coordinate perpendicular to the direct coordinate. More specifically, processing block 44 applies first a Clarke and then a Park transform to transit signals STR, STS, STT to define a quadrature signal representing the quadrature component of the movable-coordinate system of transit signals STR, STS, STT. Speed signal SV is calculated as a function of the quadrature signal of transit signals STR, STS, STT, and more specifically is defined by the output of a proportional-integral block whose input is the quadrature signal.

Processing block 44 calculates position signal SP on the basis of speed signal SV.

Control unit 40 comprises a regulating block 45, which, for each modular section 37, defines regulating signals SR for a respective power assembly 39 as a function of position signal SP, speed signal SV, target speed signal SVD, and a target position signal SPD. On the basis of regulating signal SR, power assembly 39 regulates the intensity I, frequency F, and phases R, S, T of the electric current of the groups of power windings 24 to achieve a speed V of slide 21 as close as possible to target speed VD.

Linear electric motor 5 is also configured to move transportation units 3 (as seen in FIG. 1) along path P1 in the opposite to normal travelling direction. This is achieved by inverting the phase sequence, and is useful for equally spacing transportation units 3.

With reference to FIG. 7, control unit 40 comprises a reference winding 46 and a compensating block 47, which compensate for any electromagnetic noise that might deteriorate each transit signal STR, STS, STT acquired by each control winding 36.

Reference winding 46 is located to acquire a noise signal SD indicating the electromagnetic fields of any electromagnetic noise on control winding 36. To do this, reference winding 46 is located far enough away from slide 21 and power windings 24 to avoid picking up the magnetic fields produced by them.

Compensating block 47 receives the transit signals STR, STS, STT associated with respective control windings 36, and noise signal SD from reference winding 46, and processes transit signals STR, STS, STT as a function of noise signal SD, to compensate for any noise.

In an alternative embodiment, reference winding 46 is eliminated, and compensating block 47 receives noise signal SD from a control winding 36 of a modular section 37 other than the one associated at the time with the transit signals STR, STS, STT being noise-corrected. More specifically, the modular section 37 must be chosen from those not supplied with current at the time.

In an alternative embodiment (not shown in the drawings), the signals from the control winding are processed digitally. To do this, each control winding, as opposed to being connected to the other control windings, is connected directly to the control unit, which disregards phases R', S', T' and processes the signals solely as a function of the spatial arrangement of the control windings associated with the transit signals. More specifically, the control unit is associated with at least two signals of two control windings, and, given two instantaneous positions, determines speed signal SV and position signal SP.

In this variation, the control unit comprises digital circuits and a microcontroller.

In another embodiment (not shown), the slide comprises a metal plate instead of permanent magnets.

In another embodiment of the present disclosure (not shown in the drawings), the sensors are not embedded in the elongated body, and the elongated body comprises sensor seats.

In another embodiment of the present disclosure (not shown in the drawings), the sensors are not embedded in the elongated body, and the elongated body has sensor assembly markers.

In this embodiment, both the seats and markers are formed when manufacturing the elongated body to minimize noise generated by the power windings on the sensors.

Though the above description refers specifically to a cable transportation system, such as a cable-car or chair-lift, the present disclosure also extends to any type of transportation system, (e.g., a rail transportation system), driven by the actuating described in the present disclosure.

Clearly, changes may be made to the system and method as described herein without, however, departing from the scope of the accompanying Claims and without diminishing its intended advantages. It should thus be understood that various changes and modifications to the presently disclosed embodiments will be apparent to those skilled in the art and it is therefore intended that such changes and modifications be covered by the appended claims.

The invention claimed is:

1. A passenger transportation system comprising:
   at least one rail extending along a path;
   a trolley movable along the at least one rail;
   an actuating device including a linear electric motor having:
      at least one slide fitted to the trolley, and
      a linear stator extending at least partly along the path, said linear stator including an elongated body and a plurality of power windings embedded in the elongated body, wherein said plurality of power windings generate a first magnetic field by passage of current in said power windings, and said plurality of power windings includes:
         at least a first coil wound about a first axis in a first winding direction, and
         a second coil wound about a second axis in a second, opposite winding direction, the first coil and the second coil being connected to each other; and
   a plurality of sensors fitted to the elongated body and including a control winding associated with the power windings, said control winding located at least partly between the first coil and the second coil to define a region enclosed by the control winding and traversed by the first magnetic field at the first coil and the second coil such that a total magnetic flux of the first magnetic field of the power windings associated with the control winding is nil, said plurality of sensors configured to sense a position of the trolley and transmit at least one signal utilized to control the position of the trolley.

2. The passenger transportation system of claim 1, wherein the sensors are embedded in the elongated body.

3. The passenger transportation system of claim 1, wherein the elongated body includes a plurality of modular units aligned with one another along the path, each modular unit extending along an axis of symmetry and being one of: a flat plate and a curved plate, to respectively define one of: a straight portion of the path and a curved portion of the path.

4. The passenger transportation system of claim 3, wherein each modular unit includes:
   a designated quantity of the plurality of power windings, and
   a plurality of power connection elements configured to connect at least one of the designated quantity of power windings to at least one of the designated quantity of power windings of an adjacent one of the modular units, each power connection element being substantially parallel to the axis of symmetry.

5. The passenger transportation system of claim 4, wherein a plurality of the modular units each have two end faces, a first of the two end faces facing one of the end faces of a first adjacent one of the modular units and a second of the two end faces facing one of the end faces of a second adjacent one of the modular units, and the power connection elements being located on the end faces and substantially symmetrical with respect to the axis of symmetry.

6. The passenger transportation system of claim 3, wherein each modular unit includes:
   a designated quantity of the plurality of sensors; and
   a plurality of control connection elements configured to connect at least one of the designated quantity of sensors of the modular unit to at least one of the designated quantity of sensors of an adjacent one of the modular units, each control connection element being substantially parallel to the axis of symmetry.

7. The passenger transportation system of claim 6, wherein a plurality of the modular units each have two end faces, a first of the two end faces facing one of the end faces of a first adjacent one of the modular units and a second of the two end faces facing one of the end faces of a second adjacent one of the modular units and the control connection elements being located on the end faces.

8. The passenger transportation system of claim 1, wherein:
   the at least one slide includes a second magnetic field generator configured to generate a second magnetic field which interacts with the first magnetic field and causes the at least one slide to move along the path, and
   the second magnetic field travels through the control winding when the at least one slide travels close to the control winding and the control winding is configured to generate current by interaction with the second magnetic field.

9. The passenger transportation system of claim 1, wherein the control winding has a plane of symmetry equidistant from the first axis and the second axis.

10. The passenger transportation system of claim 1, wherein the first coil and the second coil lie in two substantially parallel planes and the control winding is located in a gap formed between the two substantially parallel planes.

11. The passenger transportation system of claim 1, wherein the control winding is coupled to the at least one slide to generate a transit signal by a varying magnetic flux produced by relative movement of the at least one slide with respect to the control winding.

12. The passenger transportation system of claim 11, which includes a power assembly connected to said power windings and configured to power said power windings with electric current having an amplitude, a frequency, and a phase calculated based on the generated transit signal.

13. The passenger transportation system of claim 8, which includes a control unit connected to the control windings to receive a plurality of transit signals and configured to control the power windings as a function of the transit signals.

14. The passenger transportation system of claim 13, wherein the control unit includes a compensating block configured to compensate for any noise in the transit signals.

15. The passenger transportation system of claim 13, which includes a reference winding positioned such that the first magnetic field of the power windings does not link with the reference winding and wherein the control unit is connected to the reference winding to receive a noise signal correlated with any noise detected by the reference winding.

16. The passenger transportation system of claim 15, wherein the reference winding is one of the control windings associated with a non-powered one of the power windings.

17. The passenger transportation system of claim 1, which includes:
   a draw cable,
   at least one transportation unit connected to the trolley and selectively connectable to the draw cable by a coupling device, and
   at least one passenger station where the at least one transportation unit is disengaged from the draw cable, wherein the linear stator extends along the at least one passenger station to move the transportation unit along a portion of said path.

18. A method of controlling a transportation system including an actuating device having a linear electric motor including at least one slide and a linear stator extending at least partly along a path, said linear stator including at least one control winding and at least one power winding associated with said at least one control winding, and the at least one slide and the linear stator being magnetically coupled to induce movement of the at least one slide along the path, said method comprising:
   locating the at least one control winding inside the linear stator such that a total magnetic flux produced by the at least one power winding associated with the at least one control winding is nil;
   detecting, by the at least one control winding of said linear stator of the linear electric motor of the actuating device, a transit signal; and
   determining at least one of: a position of the at least one slide and a speed of the at least one slide as a function of the detected transit signal.

19. The method of claim 18, which includes powering the at least one power winding as a function of the detected transit signal.

20. The method of claim 18, which includes:
   utilizing a reference winding to detect any noise, said reference winding located such that a first magnetic field generated by the at least one power winding does not link with the reference winding, and
   processing the detected transit signal based on any detected noise.

21. The method of claim 18, which includes controlling the linear electric motor based on at least one of: the position of the at least one slide and the speed of the at least one slide.

22. The method of claim 18, wherein the linear electric motor includes three control windings, each associated with a phase and configured to supply a respective one of a plurality of transit signals and which includes:
   processing the transit signals to define a quadrature signal representing a quadrature component of the transit signals in a movable-coordinate system, and
   defining the speed of the at least one slide based on the quadrature signal of the transit signals.

23. The method of claim 18, which includes detecting a voltage at at least one terminal of the at least one control winding in response to varying magnetic flux produced by passage of the at least one slide with the at least one control winding.

24. A transportation rail system comprising:
   at least one rail extending along a path;
   an actuating device including a linear electric motor having:
      at least one slide configured to be fitted to a trolley, and
      a linear stator extending at least partly along the path, said linear stator including an elongated body and a plurality of power windings embedded in the elongated body, wherein said plurality of power windings generate a first magnetic field by passage of current in said power windings, and said plurality of power windings includes:
         at least a first coil wound about a first axis in a first winding direction, and
         a second coil wound about a second axis in a second, opposite winding direction, the first coil and the second coil being connected to each other; and a plurality of sensors fitted to the elongated body and including a control winding associated with the power windings, said control winding located at least partly between the first coil and the second coil to define a region enclosed by the control winding and traversed by the first magnetic field at the first coil and the second coil such that a total magnetic flux of the first magnetic field of the power windings associated with the control winding is nil, said plurality of sensors configured to sense a position of the trolley and transmit at least one signal utilized to control the position of the trolley.

25. The transportation rail system of claim 24, wherein the sensors are embedded in the elongated body.

26. The transportation rail system of claim 24, wherein the elongated body includes a plurality of modular units aligned with one another along the path.

27. The transportation rail system of claim 26, wherein each modular unit includes:
 a designated quantity of the plurality of power windings, and
 a plurality of power connection elements configured to connect at least one of the designated quantity of power windings to at least one of the designated quantity of power windings of an adjacent one of the modular units, each power connection element being substantially parallel to the axis of symmetry.

28. The transportation rail system of claim 26, wherein each modular unit includes:
 a designated quantity of the plurality of sensors; and
 a plurality of control connection elements configured to connect at least one of the designated quantity of sensors of the modular unit to at least one of the designated quantity of sensors of an adjacent one of the modular units, each control connection element being substantially parallel to the axis of symmetry.

29. The transportation rail system of claim 24, wherein:
 the at least one slide includes a second magnetic field generator configured to generate a second magnetic field which interacts with the first magnetic field and causes the at least one slide to move along the path, and
 the second magnetic field travels through the control winding when the at least one slide travels close to the control winding and the control winding is configured to generate current by interaction with the second magnetic field.

30. The transportation rail system of claim 24, wherein the control winding is coupled to the at least one slide to generate a transit signal by a varying magnetic flux produced by relative movement of the at least one slide with respect to the control winding.

31. The transportation rail system of claim 24, which includes a control unit connected to the control windings to receive a plurality of transit signals and configured to control the power windings as a function of the transit signals.

32. A passenger transportation system comprising:
 at least one rail extending along a path;
 a trolley movable along the at least one rail;
 an actuating device including a linear electric motor having:
  at least one slide fitted to the trolley, and
  a linear stator extending at least partly along the path, said linear stator including an elongated body and a plurality of power windings embedded in the elongated body, wherein the power windings generates a first magnetic field by passage of current in said power windings; and
 a plurality of sensors fitted to the elongated body and including a control winding, said control winding being located at least partly between the power winding to define a region enclosed by the control winding and traversed by the first magnetic field such that a total magnetic flux of the first magnetic field of the power windings linked to the control winding is nil, said plurality of sensors configured to sense a position of the trolley and transmit at least one signal utilized to control the position of the trolley.

33. The passenger transportation system of claim 32, wherein the power windings include: at least a first coil, and a second coil; the first coil and the second coil being connected to each other, and the control winding being located at least partly between the first coil and the second coil, so that the region is traversed by the first magnetic field at the first coil and the second coil.

34. The passenger transportation system of claim 33, wherein the first coil is wound about a first axis in a first winding direction, and a second coil is wound about a second axis in a second, opposite winding direction.

35. The passenger transportation system of claim 34, wherein the control winding has a plane of symmetry equidistant from the first axis and the second axis.

36. The passenger transportation system of claim 33, wherein the first coil and the second coil lie in two substantially parallel planes and the control winding is located in a gap formed between the two substantially parallel planes.

37. The passenger transportation system of claim 32, wherein the control winding is coupled to the at least one slide to generate a transit signal by a varying magnetic flux produced by relative movement of the at least one slide with respect to the control winding.

38. The passenger transportation system of claim 32, which includes a power assembly connected to said power windings and configured to power said power windings with electric current having an amplitude, a frequency, and a phase calculated based on the generated transit signal.

39. The passenger transportation system of claim 32, which includes a control unit connected to the control windings to receive a plurality of transit signals and configured to control the power windings as a function of the transit signals.

40. The passenger transportation system of claim 32, wherein the control unit includes a compensating block configured to compensate for any noise in the transit signals.

41. The passenger transportation system of claim 32, which includes a reference winding positioned such that the first magnetic field of the power windings does not link with the reference winding and wherein the control unit is connected to the reference winding to receive a noise signal correlated with any noise detected by the reference winding.

42. The passenger transportation system of claim 41, wherein the reference winding is one of the control windings associated with a non-powered one of the power windings.

43. A passenger transportation system comprising:
 at least one rail extending along a path;
 a trolley movable along the at least one rail; and
 an actuating device including a linear electric motor having:
  at least one slide fitted to the trolley, and
  a linear stator extending at least partly along the path, said linear stator including:
   an elongated body,
   three power windings embedded in the elongated body,
   three control windings respectively associated with the three power windings and located such that a total magnetic flux of a magnetic field of the three power windings associated with the three control winding is nil, and a power assembly connected to said three power windings and configured to, in response to being provided a three phase signal, power said three power windings with a three phase voltage.

44. The passenger transportation system of claim 43, which includes a control unit configured to process the three phase signal and calculate a speed signal to provide to the power assembly.

45. The passenger transportation system of claim 43, which includes a control unit configured to process the three phase signal and calculate a position signal to provide to the power assembly.

46. The passenger transportation system of claim 43, which includes a control unit configured to process the three phase signal applying a Clarke transform to define one of: a speed signal and a position signal.

47. The passenger transportation system of claim 46, which includes a control unit configured to process the three phase signal applying a Park transform to define one of: the speed signal and the position signal.

* * * * *